(12) United States Patent
Adams et al.

(10) Patent No.: US 10,331,453 B2
(45) Date of Patent: *Jun. 25, 2019

(54) SYSTEM MANAGEMENT MODE TRUST ESTABLISHMENT FOR OS LEVEL DRIVERS

(71) Applicant: INTEL CORPORATION, Santa Clara, CA (US)

(72) Inventors: Nicholas J. Adams, Beaverton, OR (US); Vincent J. Zimmer, Federal Way, WA (US); Lee G. Rosenbaum, Hillsboro, OR (US); Giri P. Mudusuru, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,531

(22) Filed: Aug. 21, 2017

(65) Prior Publication Data

US 2018/0129502 A1    May 10, 2018

Related U.S. Application Data

(63) Continuation of application No. 14/666,219, filed on Mar. 23, 2015, now Pat. No. 9,740,492.

(51) Int. Cl.
| | |
|---|---|
| *G06F 11/00* | (2006.01) |
| *G06F 9/30* | (2018.01) |
| *G06F 9/34* | (2018.01) |
| *G06F 21/44* | (2013.01) |
| *G06F 21/57* | (2013.01) |
| *G06F 21/74* | (2013.01) |

(52) U.S. Cl.
CPC ............ *G06F 9/30189* (2013.01); *G06F 9/34* (2013.01); *G06F 21/44* (2013.01); *G06F 21/57* (2013.01); *G06F 21/74* (2013.01)

(58) Field of Classification Search
USPC .............................. 726/22–25; 713/187–189
See application file for complete search history.

(56) References Cited

U.S. PATENT DOCUMENTS

| | | | | |
|---|---|---|---|---|
| 9,176,752 | B1 * | 11/2015 | Marr ..................... | G06F 9/4411 |
| 9,753,738 | B2 * | 9/2017 | Ali ....................... | G06F 9/45558 |
| 2001/0008015 | A1 * | 7/2001 | Vu .......................... | G06F 21/34 |
| | | | | 713/189 |
| 2003/0041248 | A1 * | 2/2003 | Weber ................... | G06F 21/575 |
| | | | | 713/182 |
| 2003/0172265 | A1 * | 9/2003 | Vu ........................ | G01S 13/9023 |
| | | | | 713/164 |
| 2008/0126779 | A1 * | 5/2008 | Smith ................... | G06F 21/575 |
| | | | | 713/2 |
| 2009/0125716 | A1 * | 5/2009 | Wooten .................. | G06F 21/57 |
| | | | | 713/164 |

(Continued)

*Primary Examiner* — Amare F Tabor

(57) ABSTRACT

Various embodiments are generally directed to establishing trust in system management mode. An operating system management mode driver can invoke a system management mode and provide a signature to the system management mode to authenticate the driver with. Additionally, a hash value of the driver can be used to determine whether the driver is authorized to invoke system management mode or particular operations or features of system management mode.

25 Claims, 8 Drawing Sheets

(56) References Cited

U.S. PATENT DOCUMENTS

| | | | |
|---|---|---|---|
| 2010/0057982 A1* | 3/2010 | Barde | G06F 21/57 711/104 |
| 2011/0113181 A1* | 5/2011 | Piwonka | G06F 8/65 711/102 |
| 2013/0124843 A1* | 5/2013 | Bobzin | G06F 21/575 713/2 |

* cited by examiner

SYSTEM MANAGEMENT MODE TRUST ESTABLISHMENT FOR OS LEVEL DRIVERS

CROSS-REFERENCE TO RELATED APPLICATION

This application is a continuation of, claims the benefit of, and claims priority to U.S. patent application Ser. No. 14/666,219 filed on Mar. 23, 2015, the subject matter of which is incorporated herein by reference in its entirety.

TECHNICAL FIELD

Embodiments described herein generally relate to system management mode (SMM) operations of a computing device.

BACKGROUND

Computing systems include a mode where instructions may be executed with high privileges. For example, some computer systems include a system management mode (SMM). In SMM, normal execution of instructions, including the operating system, is suspended and special separate instructions (e.g., firmware, etc.) can be executed with high privileges.

An operating system may cause the computer system to enter SMM to manipulate various operational parameters that may not be modifiable during normal operation. For example, the operating system may initiate SMM to overwrite a secure memory location, modify a low level password (e.g. BIOS password, etc.), modify power management functionality, enable or disable security features, manipulate hardware resources, or the like.

Due to the high privileges to which instructions executed during SMM have, SMM may be used to compromise a computer system, for example, as an entry point for a Rootkit, or other malicious software.

It is with respect to these and other considerations that the embodiments described herein are needed.

DETAILED DESCRIPTION

Figure 1:
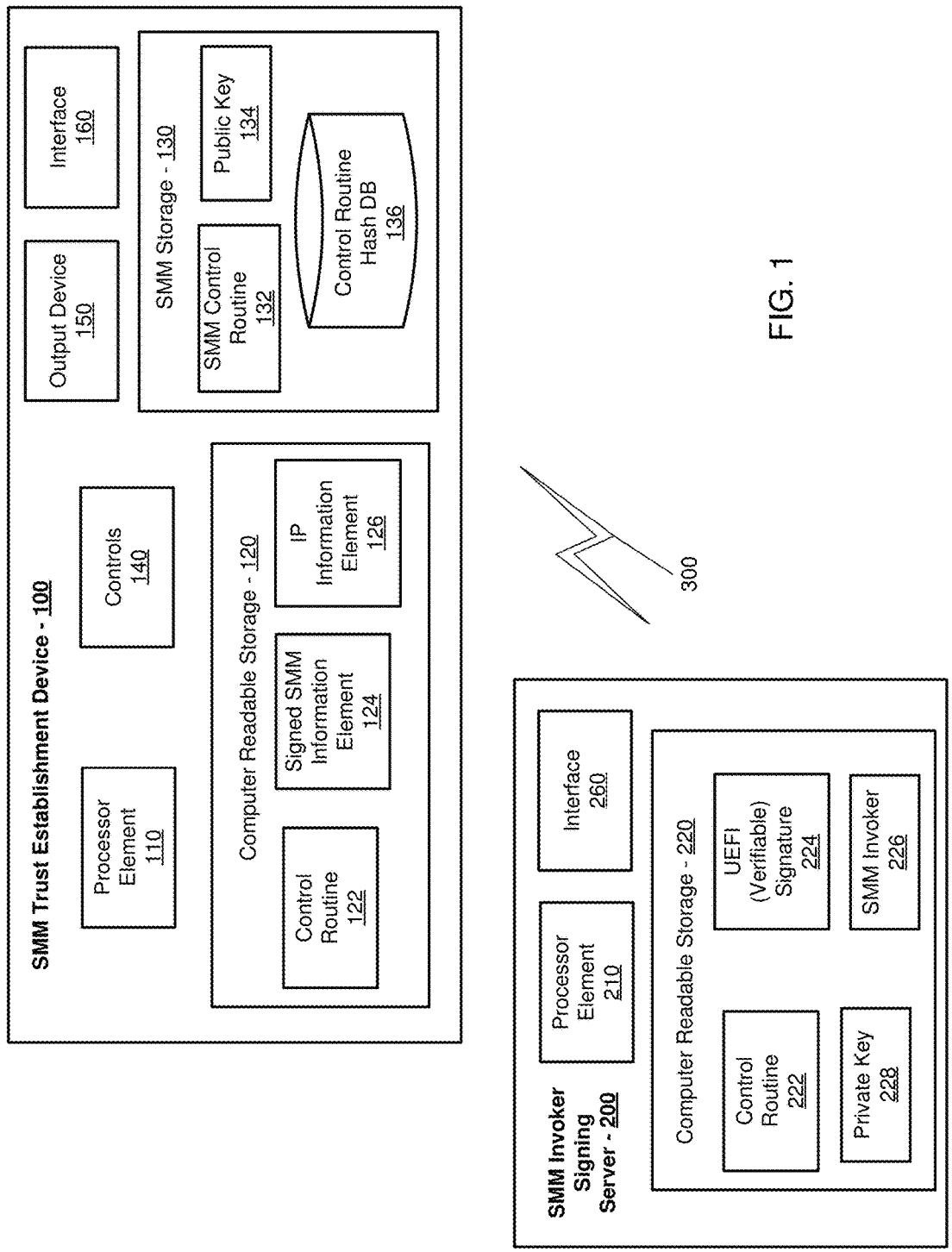
FIG. 1 illustrates a block diagram of a device according to an embodiment.

Various embodiments are generally directed to establishing trust for system management mode (SMM) operations of a computing system. Said differently, the present disclosure is generally directed to determining that operations and/or functions implemented in an SMM session are initiated by an authorized entity. For example, the present disclosure may be implemented to generate a signed SMM information element (e.g., to include an SMM invoker, or the like), which can be authenticated in an SMM session. The signed SMM information element can be signed based on a private-key and authenticated based on a corresponding public-key. Furthermore, the SMM information element can include a hash of the component (e.g., OS driver, calling application, or the like) invoking SMM. During the SMM session, the hash can be used to determine whether the component invoking SMM has privileges to invoke SMM and/or invoke certain SMM operations and/or functions.

It is noted, that the present disclosure refers to a system management mode (SMM). It is noted, that this is not intended to be limiting to the SMM implementations. For example, the present disclosure may be implemented with any of a variety of secure machine modes, such as, for example, TrustZone® for AMR-LT architectures, SMM for x86 architectures, or the like.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a block diagram of a SMM trust establishment device 100 and an SMM invoker signing server 200. In general, the device 100 and/or the server 200 may be any of a variety of types of computing devices, including without limitation, a laptop computer, a netbook computer, an ultra-book computer, a tablet computer, a handheld personal data assistant, a smartphone, a body-worn computing device (e.g., incorporated into clothing,) a media streaming device, an audio computing device, a video computing device, a smart television, or the like.

With various examples, the device 100 incorporates one or more of processor element 110, computer-readable storage 120, SMM storage 130, controls 140, an output device 150, and an interface 170. The computer-readable storage 120 stores one or more of a control routine 122, a signed SMM information element 124, and an instruction pointer (IP) 126. The SMM storage 130 stores one or more of an SMM control routine 132 and a public key 134. Additionally, the SMM storage 130 may include an invoker hash database 136.

With various examples, the server 200 incorporates one or more of processor element 210, computer-readable storage 220, and interface 260. The computer-readable storage 220 stores one or more of control routine 222, unified extensible firmware interface (UEFI) verifiable signature 224, SMM invoker 226, and private key 228.

The device 100 and the server 200 may be operably connected to one or more networks and/or to each other through one or more networks, such as, for example, the network 300. In general, the network 300 may be any network configured to facilitate communication between the device 200 and/or the server 300, and may include the Internet.

In general, the control routine 222 incorporates a sequence of instructions operative on the components of the server 200 (e.g., the processor element 210, or the like) to implement logic to sign an SMM invoker based on the private key 128 to facilitate establishment of trust in an SMM session as described herein. For example, in executing the control routine 222, the processor element 210 may generate the UEFI verifiable signature 224 based on the SMM invoker 226 and the private key 228. Additionally, in executing the control routine 222, the processor element may communicate the UEFI signature 224 and/or the SMM invoker 226 to the device 100.

In general, the control routine 122 incorporates a sequence of instructions operative on the components of the device 100 (e.g., the processor element 110, or the like) to implement logic to invoke and establish trust with a SMM session implemented by the device 100. Said differently, the control routine 122 may be configured to invoke a SMM session and provide credentials and/or information to establish trust with the SMM session. The control routine 132 incorporates a sequence of instructions operative on components of the device 100 (e.g., the processor element 110, or the like) to implement logic to implement a SMM session and determine whether the SMM session is invoked properly.

In executing the control routine 122, the processor element 110 may generate the signed SMM information element 124 and store the signed SMM information element 124 in a location within physical memory (e.g., the computer readable storage 120, or the like) of the device 100. In some examples, the signed SMM information element may be stored within a single page (e.g., 4 kilobytes, or the like) of computer readable storage 120.

In general, the signed SMM information element 124 may include an indication of an SMM invoker (e.g., the SMM invoker 226) and a signature (e.g., the UEFI signature 224) to authenticate the SMM invoker. With some examples, in executing the control routine 122, the processor element 110 may receive the UEFI signature 224 from the SMM invoker singing server 200 and generate the SMM information element 124 to include an indication of the UEFI signature 224.

Additionally, in executing the control routine 122, the processor element 110 may generate the IP information element 126 to include an indication of the address (e.g., location, or the like) of the signed SMM information element 124 in the computer readable storage 120. In general, the IP information element may be an instruction pointer, for example, an "IP" as used in some 16-bit environment, an "EIP" as used in some 32-bit computing environment, or an "RIP" as used in some 64-bit environments. Use of the term "instruction pointer" or "IP" to refer to the IP 126 generally is not intended to be limiting to a particular computing environment, and may, for example, be implemented in 16-bit, 32-bit, 64-bit, or the like computing environments.

In some examples, in executing the control routine 122, the processor element 110 may initiate SMM by sending a control signal (e.g., logic signal to a pin of the processor element 110, logic signal to a pin of the motherboard (not shown), or the like) and communicating the IP information element to the SMM session.

With some examples, in executing the control routine 122, the processor element 110 may generate a hash value (e.g., refer to FIG. 2) based on the component invoking SMM (e.g., an operating system SMM driver, a calling application, or the like) and include an indication of the hash value in the signed SMM information element 124. With some examples, the control routine 122 may incorporate the hash into the SMM invoker 226 to enable the SMM invoker to ensure that the control routine 122 has authority to invoke SMM.

In executing the control routine 132, the device 100 may enter SMM and/or initiate a SMM session. More specifically, the processor element 110 may pause execution of various processes (e.g., operating system processes, or the like) for the purposes of executing various SMM operations. It is important to note, that a variety of different SMMs and techniques for invoking SMM exist. The present disclosure may be implemented to establish trust with (or to authenticate) the component of the device 100 invoking the SMM for any of a variety of SMMs.

In executing the control routine 132, the processor component 110 may receive the IP information element 126. As noted above, the IP information element 126 may include an indication of an address of the signed SMM information element 124. Said differently, the IP information element may include a virtual address, which can be translated into a physical address for the location of the signed SMM information element 124 in memory (e.g., the computer readable storage 120, or the like).

Additionally, in executing the control routine 132, the processor element 110 may retrieve the signed SMM information element 124 from the computer-readable memory storage location based on the address indicated in the IP information element 126. Furthermore, as noted above, the signed SMM information element 124 can include an indication of an SMM invoker (e.g., refer to FIG. 2) and a signature to authenticate the SMM invoker. The signature may be based on the private key 128. In executing the control routine 132, the processor element 110 may determine whether the signature is valid based on the public key 134. More specifically, the public key 134 can be used to determine whether the signature is based on the private key 128, and therefore, authentic.

Accordingly, the control routine 132, can establish trust with a component of the device invoking SMM. More specifically, in executing the control routine 132, the processor component 110 may, execute one or more operations in SMM based on a determination that the signed SMM information element 124 is valid and/or that a hash value corresponding to component invoking SMM indicates the component is authorized to invoke SMM (or invoke the functions and/or operation requested, or the like).

In various embodiments, the processor element 110 and/or 210 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments any number of the processor element 110 may include a trusted execution environment (e.g., Intel CSE®, Intel ME®, Intel VT®, Intel SGX®, ARM TrustedZone®, or the like) to provide for the processing and/or storing of sensitive information. The trusted execution environment may be access using the geo-location techniques described herein.

In various embodiments, the storage 120 and/or the SMM storage 130 and/or the storage 220 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the controls 140 may be any of a variety of types of manually operable control including and not limited to one or more of a keyboard, mouse, keypad, touchpad, stylus, or the like. The output device may be local or remote and may be connected wirelessly or wired. In various embodiments, the output device 150 may be any of a variety of output devices, such as, for example, a display, a speaker, a haptic feedback device, or the like.

In various embodiments, the interface 160 and/or 260 may employ any of a wide variety of signaling technologies enabling the components to be coupled through a network.

Figure 2:
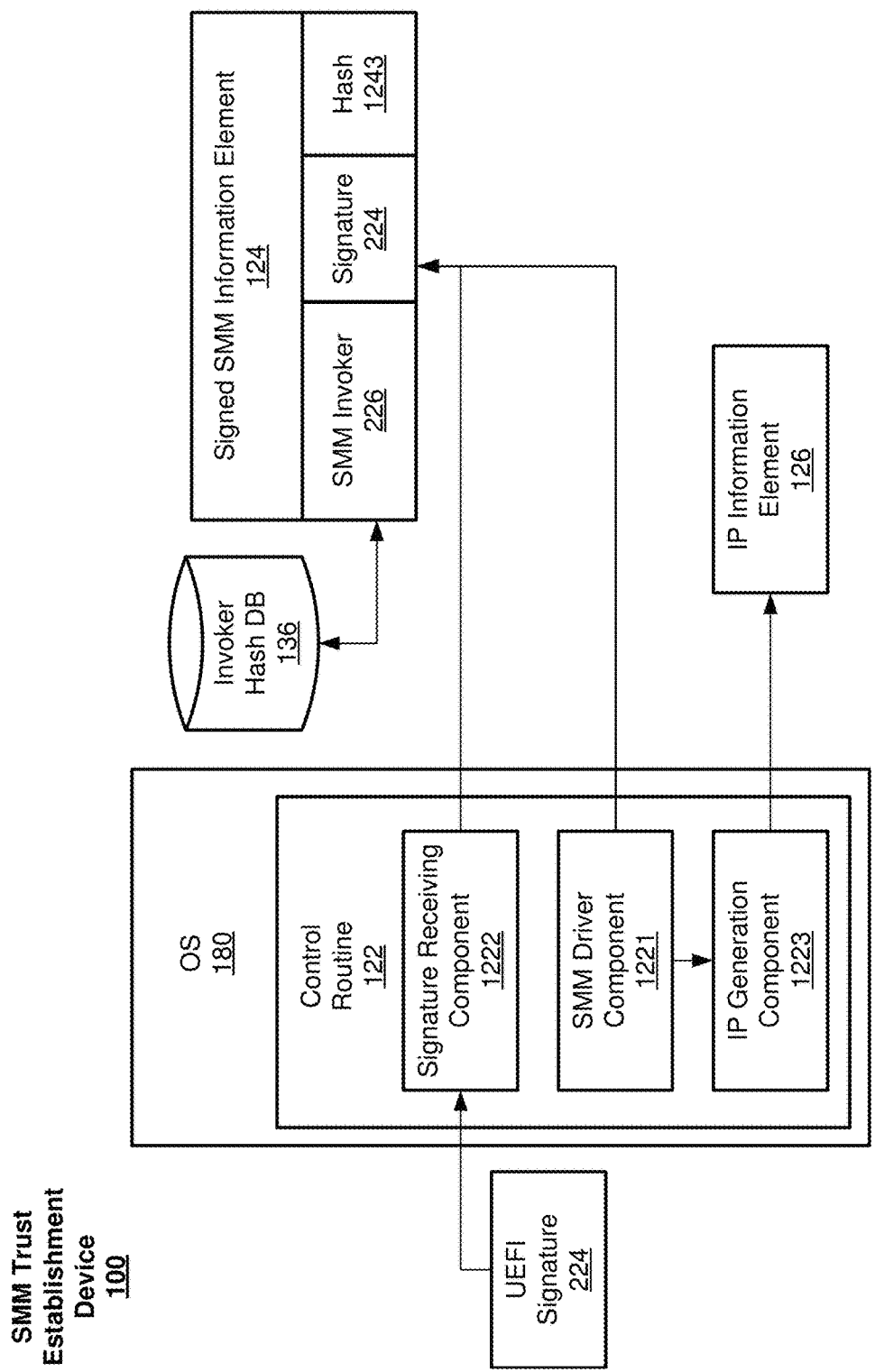
FIGS. 2-3 illustrate block diagrams of aspects of the operation of the device of FIG. 1 according to embodiments.
Figure 3:
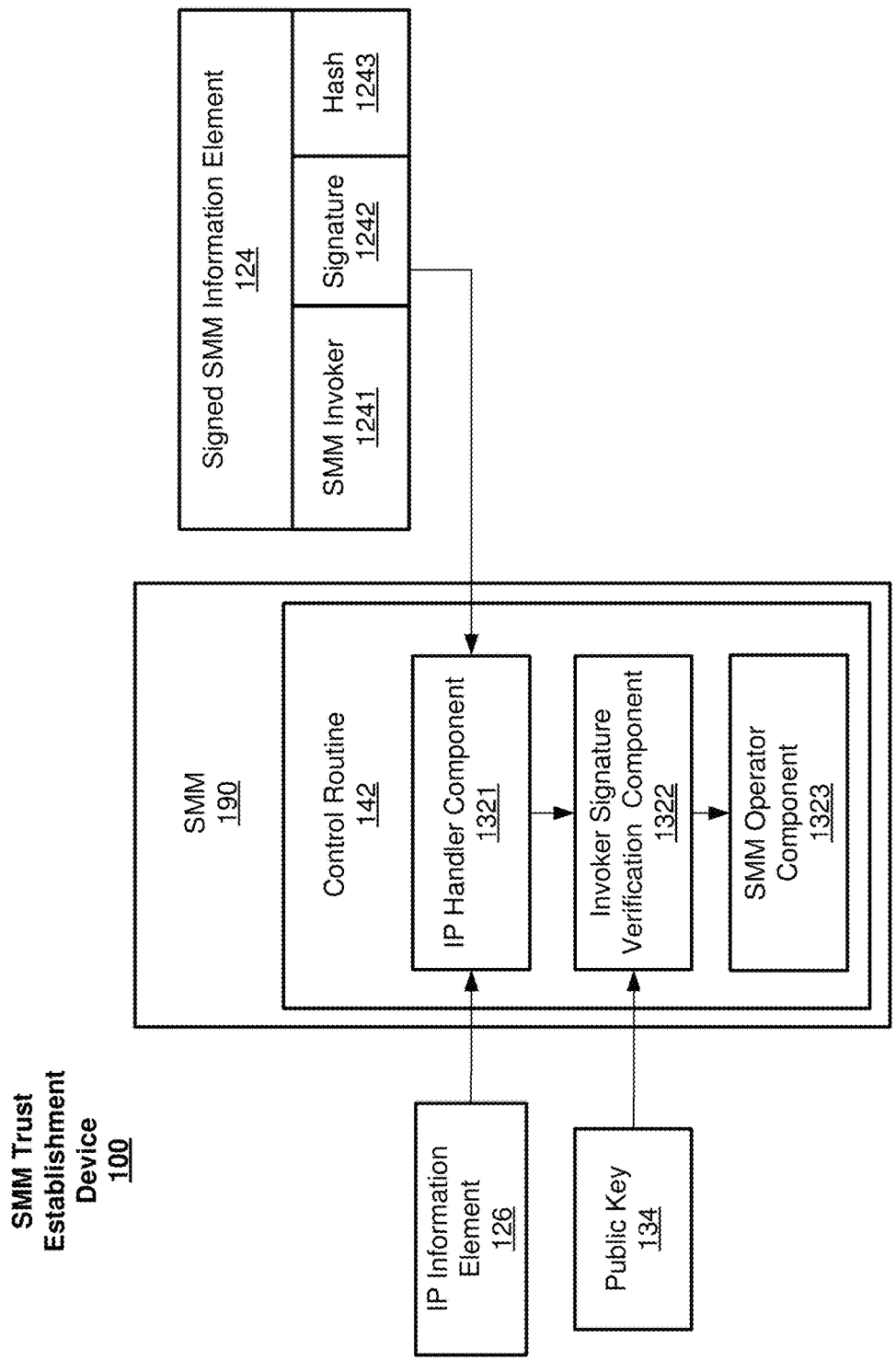

FIGS. 2-3 are block diagrams of portions of embodiments of the SMM trust establishment device 100 of FIG. 1. In general, FIG. 2 illustrates aspects of the operation of the device 100 in invoking SMM while FIG. 3 illustrates aspects of the operation of the device 100 in authenticating the invoked SMM session. More specifically, FIG. 2 illustrates aspects of the operations of the control routine 122 in invoking SMM while FIG. 3 illustrates aspects of the operation of the control routine 132 in authenticating the invoked SMM session.

In various embodiments, the control routine 122 and/or the control routine 132 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor element 110. Where one or more device drivers are included, those device drivers may provide support for any of a variety of other components, whether hardware or software components, of the device 100.

In general, the control routine 122 is configured to invoke an SMM session while the control routine 132 is configured to operate during the SMM session to authenticate the "caller" or "invoker" of the SMM session. With some examples, the control routine 122 may be implemented by or within the framework of an operating system while the control routine 132 may be implemented by or within the framework of a SMM. As such, operating system 180 is depicted in FIG. 2 while SMM 190 is depicted in FIG. 3. It is noted, the operating system 180 may be any of a variety of operating systems configured to invoke the SMM 190.

Turning more specifically to FIG. 2, the control routine 122 includes an SMM driver component 1221, an signature receiving component 1222, and an IP generation component 1223. The SMM driver component 1221 generates the signed SMM information element 124. More specifically, the SMM driver component 1221 loads an SMM invoker (e.g., the SMM invoker 226, or the like) into a memory storage location (e.g., into a single page of the computer readable storage 120). In general, the SMM invoker 226 may include logic and/or features for implementation, execution, or the like, during an SMM session (e.g., the SMM 190).

The signature receiving component 1222 receives a signature to authenticate the SMM invoker 226 (e.g., the UEFI verifiable signature 224, or the like) and adds the signature 224 to the signed SMM information element 124. In general, the signature 224 is based on the private key 128. In some examples, the signature 224 is verifiable by a unified extensible firmware interface (UEFI).

The IP generation component 1223 generates the IP information element 126 to include an indication of the address (e.g., virtual address, physical address, or the like) of the signed SMM information element 124. In some examples, the IP information element 126 is communicated (e.g., to the processor element 110, or the like) along with a control signal to "initiate" or invoke an SMM session. For example, the IP generation component 1223 may communicate a control signal to a particular pin of the processor element 110 to initiate the SMM session.

Additionally, the control routine 122 may "call" or invoke the SMM invoker 226 to initiate an SMM session. With some examples, the SMM invoker adds a hash value 1243 (e.g., SHA256, or the like) based on the SMM driver component 1221 (or the control routine 122) to the signed SMM information element 124. With some examples, the hash value 1243 may be coupled or incorporated into the SMM invoker 226 to ensure that the SMM invoker is being called by an authorized application (e.g., the SMM driver component 1221, the control routine 122, or the like).

Upon execution of the SMM invoker 226, the SMM invoker 226 may determine whether the functionality or operation indicated in the SMM invoker is authorized by the SMM driver component 1221 based on the hash value 1243. For example, the SMM invoker 226 can compare the hash value 1243 to hash values indicated in the invoker hash database 136 to determine whether the SMM driver component 1221 is authorized to invoke the functionality or operations indicated in the SMM invoker 226.

In general, during an SMM session (e.g., refer to FIG. 3) the signature 224 may be used to establish trust with the SMM driver component 1221. More specifically, the SMM session may determine that the SMM driver component 1221 is to be trusted based on the signature 224.

Turning more specifically to FIG. 3, the control routine 132 includes an IP handler component 1321. The IP handler component 1321 receives the IP 126 from the OS 180, the SMM driver 1221, or the like. Additionally, the IP handler component 1321 determines the address indicated in the IP information element 126. For example, the IP handler component 1321 may translate a virtual memory address to a physical memory address. The IP handler component 1321 additionally, retrieves the signed SMM information elements 124 based on the IP information element 126, or more specifically, the address indicated in the IP information element 126.

In some examples, the IP handler component 1321 searches physical memory (e.g., computer readable storage 120, or the like) for a page (e.g., 4 kilobytes) before and after the address indicated in the IP information element 126. In particular, the IP handler component 1321 searches for the SMM invoker 226. With some examples, the IP handler component 1321 may search for a header of the signed SMM information element 124. The IP handler component 1321 may retrieve (e.g., access, read, or the like) the signed SMM information element 124 based on identifying the header. In some examples the header may be a particular bit combination or indicator to identify the beginning of the signed SMM information element 124.

The invoker signature verification component 1322 authenticates the invoked SMM session 190 based on the signed SMM information element 124. In particular, the invoker signature verification component 1322 determines whether the signature 224 is authentic based on the public key 134.

The SMM operator component 1323 implements SMM operations or functionality based on the SMM invoker 226. Said differently, the SMM operator component 1323 executes one or more operations in the SMM session 190 based on the SMM invoker 226 and a determination that the signature 224 is valid. For example, the SMM invoker 226 may include an indication or control signal to change a BIOS password, modify an operating parameters of one of the hardware components (e.g., processor element 110, graphics processing unit, or the like) of the device 100, read and/or write data to a secured storage location (e.g., a secured EEPROM location, or the like).

Figure 4:
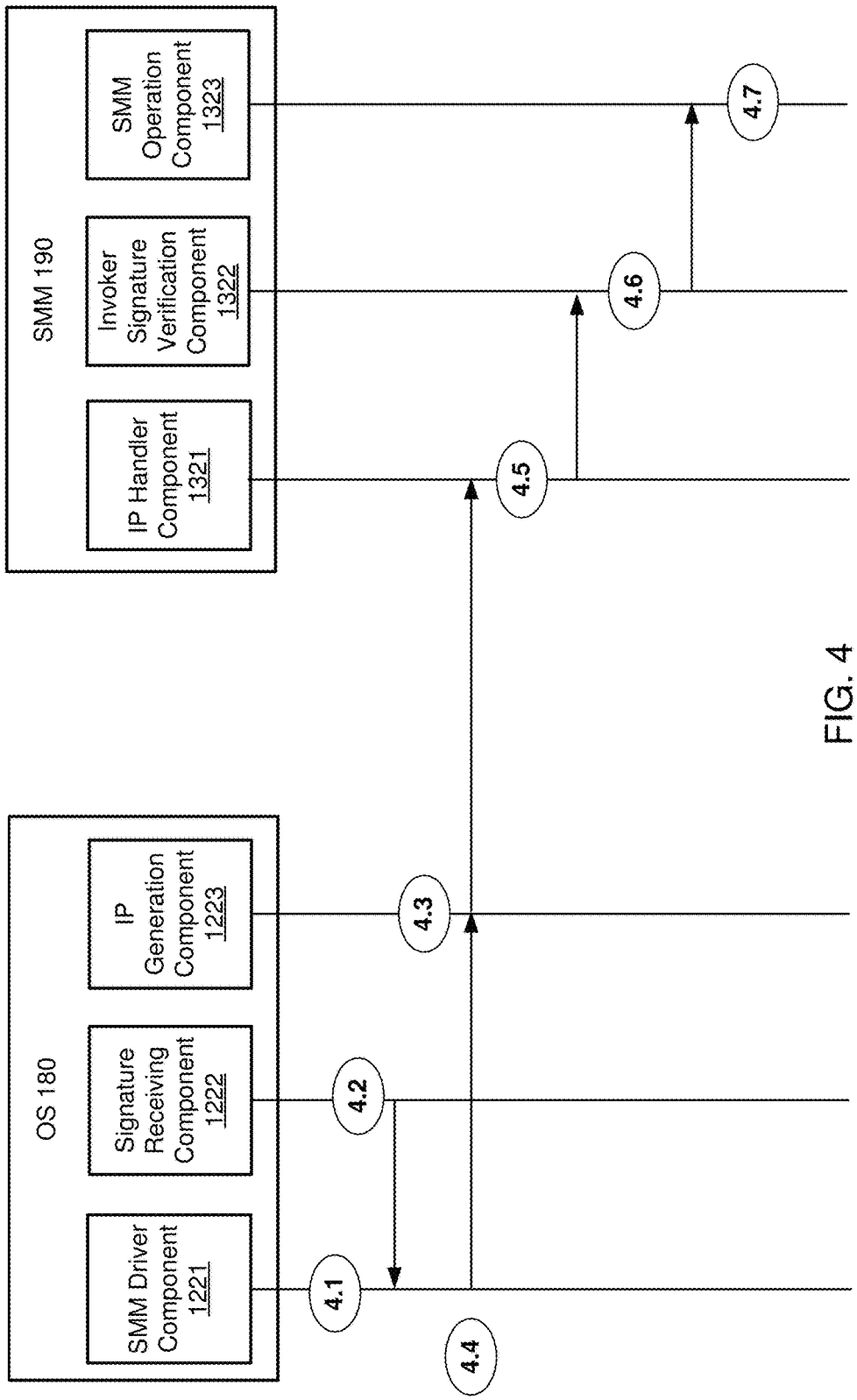
FIG. 4 illustrates a technique according to an embodiment.

FIG. 4 illustrates a technique 400 for establishing trust in SMM that may be implemented according to various embodiments of the present disclosure. As depicted, the technique 400 includes operations or blocks 4.A, where A is a positive integer. Furthermore, the technique 400 is described with reference to the device 100 of FIGS. 1-3. However this is not limiting.

Beginning at block 4.1, an SMM OS level driver (e.g., the SMM driver component 1221) generates a signed SMM information element including an SMM invoker to a single page within a location of a computer readable storage. For example, the SMM driver component 1221 may generate the signed SMM information element 124, including the SMM invoker 226 (e.g., by adding, loading, or the like) the SMM invoker 226 to the signed SMM information element 124. Continuing to block 4.2, the signature receiving component 1222 adds a signature to the signed SMM information element 124 to authenticate the SMM driver component 1221. For example, the signature receiving component 1222 may add the signature 224 to the signed SMM information element 124. In some examples, the signature can be based on the private key 128 (e.g., as generated by the server 200, or the like), which corresponds to the public key 134.

Continuing to block 4.3, the IP generation component 1223 generates the IP information element 126 including an indication of the location of the signed SMM information element in the computer readable storage (e.g., the storage 120, or the like). Additionally, the IP generation component 1223 can generate a hash value based on the SMM driver component 1221 and add the hash value to the signed SMM information element 124 or the IP information element 126.

Continuing to block 4.4, the SMM driver component 1221 sends a control signal to invoke SMM (e.g., by sending a control signal to a pin of the processing element 110, or the like) and communicates the IP information element 126 to the SMM. In some examples, the SMM driver component 1221 calls the SMM invoker 226. Upon execution of the SMM invoker 226, the SMM invoker 226 may determine whether the SMM driver component 1221 is authorized to call the SMM invoker based on the hash value 1243 and the hash value database 136.

Continuing to block 4.5, upon invocation of SMM, the IP information element 126 is received (e.g., captured, or the like) and the address of the signed SMM information element 124 is determined from the IP information element 126. For example, the IP handler component 1321 may receive the IP information element 126 and translate the indication of the virtual address to a physical address to locate and retrieve the signed SMM information element 124.

Continuing to block 4.6, the signature indicated in the signed SMM information element 124 is verified. For example, the invoker signature verification component can authenticate the signature 224 based on the public key 134. Continuing to block 4.7, operations and/or functionality can be implemented in SMM, based on the SMM invoker 226. For example, the SMM operation component 1323 may cause the device 100 to implement operations and/or features specified in the SMM invoker 226.

Figure 5:
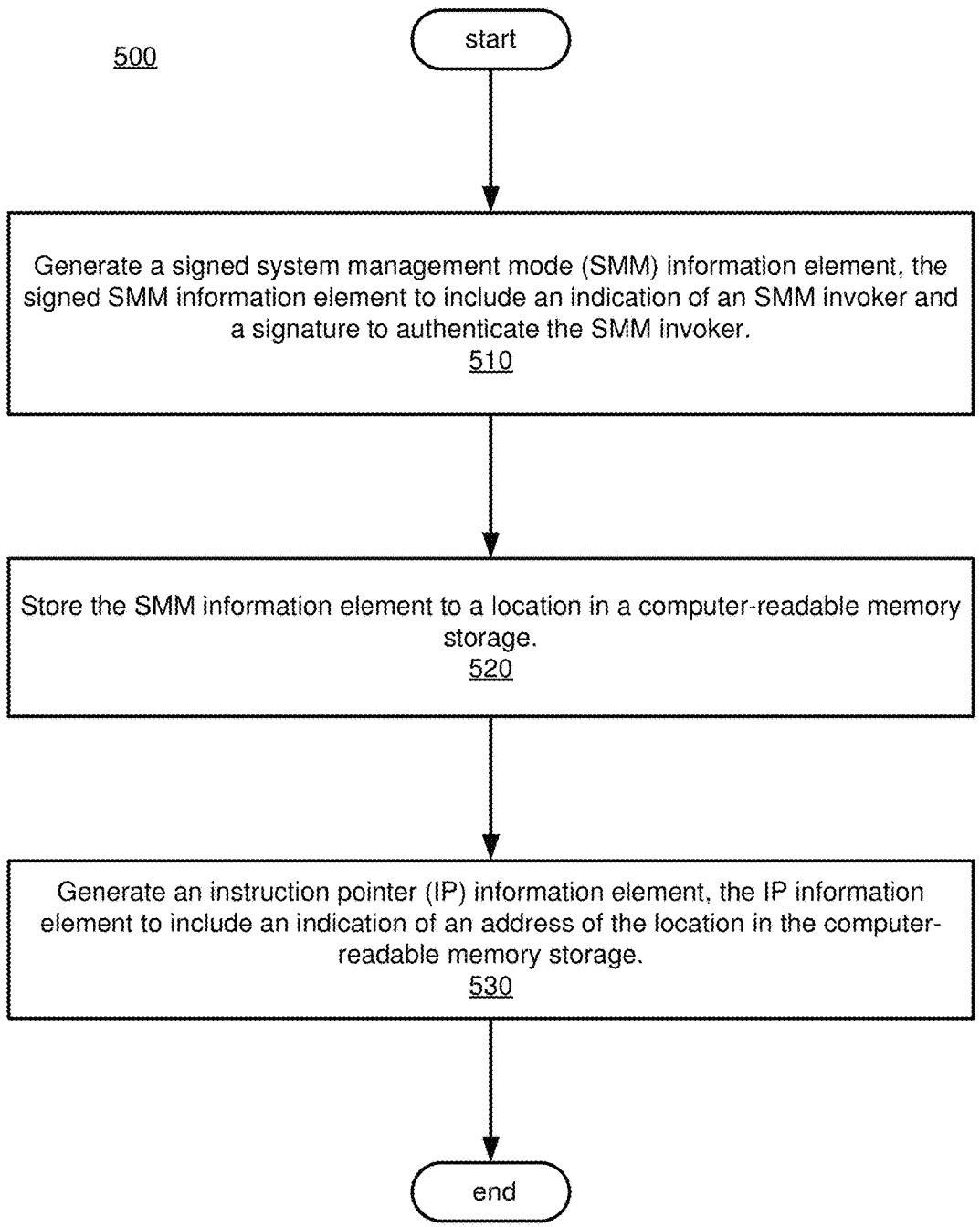
FIGS. 5-6 each illustrate logic flows according to various embodiments.
Figure 6:
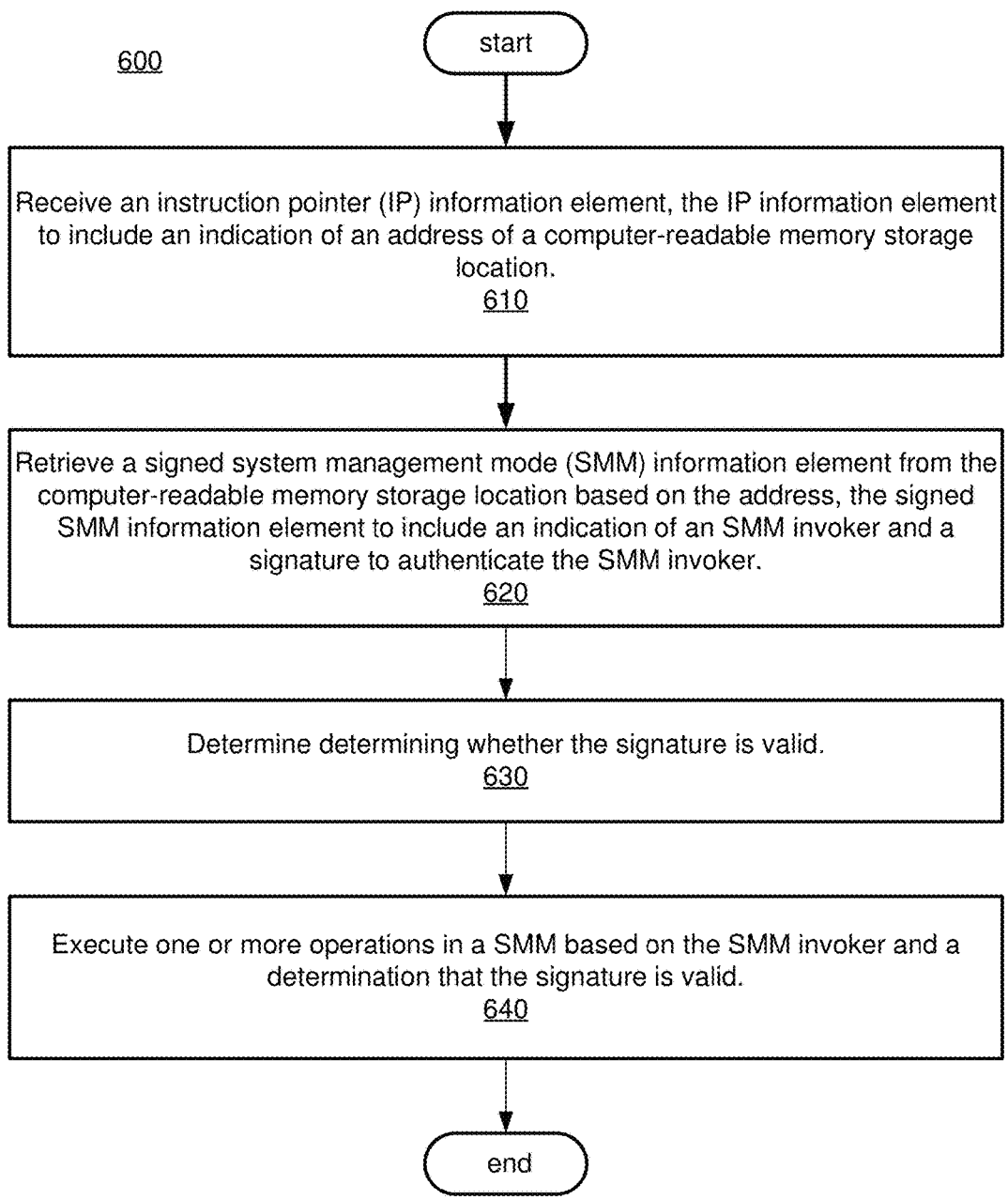

FIGS. 5-6 illustrate embodiments of logic flows for establishing trust in SMM. For example, the logic flows may be implemented to generate the signed SMM information element 124 and the initiate SMM and authenticate the SMM based on the signed SMM information element 124. It is to be appreciated, that the logic flows are described with reference to FIGS. 1-3 and the device 100. However, examples are not limited in this context and in particular, systems and/or devices including similar or different component to those depicted in FIGS. 1-3 may implement the logic flows.

Turning more specifically to FIG. 5, the logic flow 500 may begin at block 510. At block 510, "generate a signed system management mode (SMM) information element, the signed SMM information element to include an indication of an SMM invoker and a signature to authenticate the SMM invoker," the control routine 122 may generate the signed SMM information element 124. For example, the SMM driver component 1221 may generate the signed SMM information element 124, including adding the SMM invoker 226. Additionally, at block 510, the signature receiving component 1222 may receive the signature 224 (e.g., from the server 200, or the like), the signature 224 based on the private key 128. Furthermore, the component 1222 may add the signature to the signed SMM information element.

Continuing to block 520, "store the SMM information element to a location in a computer-readable memory storage," the control routine 122 may store the signed SMM information element 124 to the storage 120. For example, the SMM driver component 1221 may store the signed SMM information element 124 into a single page within physical memory (e.g., the storage 120, or the like).

Continuing to block 530, "generate an instruction pointer (IP) information element, the IP information element to include an indication of an address of the location in the computer-readable memory storage," the control routine 122 may generate the IP information element 126. For example, the IP generation component 1223 may generate the IP information element 126 including an indication of the address of the signed SMM information element 124.

Turning more specifically to FIG. 6, the logic flow 600 is depicted. The logic flow 600 may begin at block 610. At block 610, "receive an instruction pointer (IP) information element, the IP information element to include an indication of an address of a computer-readable memory storage location," the control routine 132 may receive an IP information element. For example, the IP handler component 1321 may receive the IP information element 126, including an indication of an address for the signed SMM information element 124.

Continuing to block 620, "retrieve a signed system management mode (SMM) information element from the computer-readable memory storage location based on the address, the signed SMM information element to include an indication of an SMM invoker and a signature to authenticate the SMM invoker," the control routine 132 may retrieve the signed SMM information element 124. For example, the IP handler component 1321 may retrieve the signed SMM information element from physical memory (e.g., storage 120, or the like) based on the address indicated in the IP information element (e.g., searching within a page of memory before and after the address to identify and retrieve the information element).

Continuing to block 630, "determine determining whether the signature is valid," the control routine 132 determines whether the signature indicated in the signed SMM information element 124 is valid. For example, the invoker signature validation component 1322 may determine whether the signature is valid based on the public key 134.

Continuing to block 640, "execute one or more operations in a SMM based on the SMM invoker and a determination that the signature is valid," the control routine 132 may implement operations and/or features in SMM based on a determination that the signature is valid. For example, the SMM operator component 1323 may implement operations and/or features based on the SMM invoker 226 and a determination that the signature 224 is valid.

Figure 7:
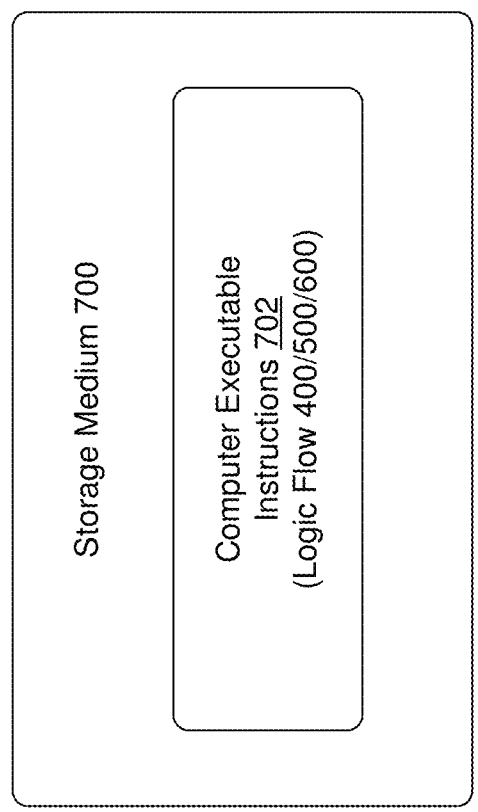
FIG. 7 illustrates an embodiment of computer-readable storage medium.

FIG. 7 illustrates an embodiment of a storage medium 700. The storage medium 700 may comprise an article of manufacture. In some examples, the storage medium 700 may include any non-transitory computer readable medium or machine readable medium, such as an optical, magnetic or semiconductor storage. The storage medium 700 may store various types of computer executable instructions e.g., 702). For example, the storage medium 700 may store various types of computer executable instructions to technique 400. In some examples, the storage medium 700 may store various types of computer executable instructions to implement logic flow 500. In some examples, the storage medium 700 may store various types of computer executable instructions to implement logic flow 600.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
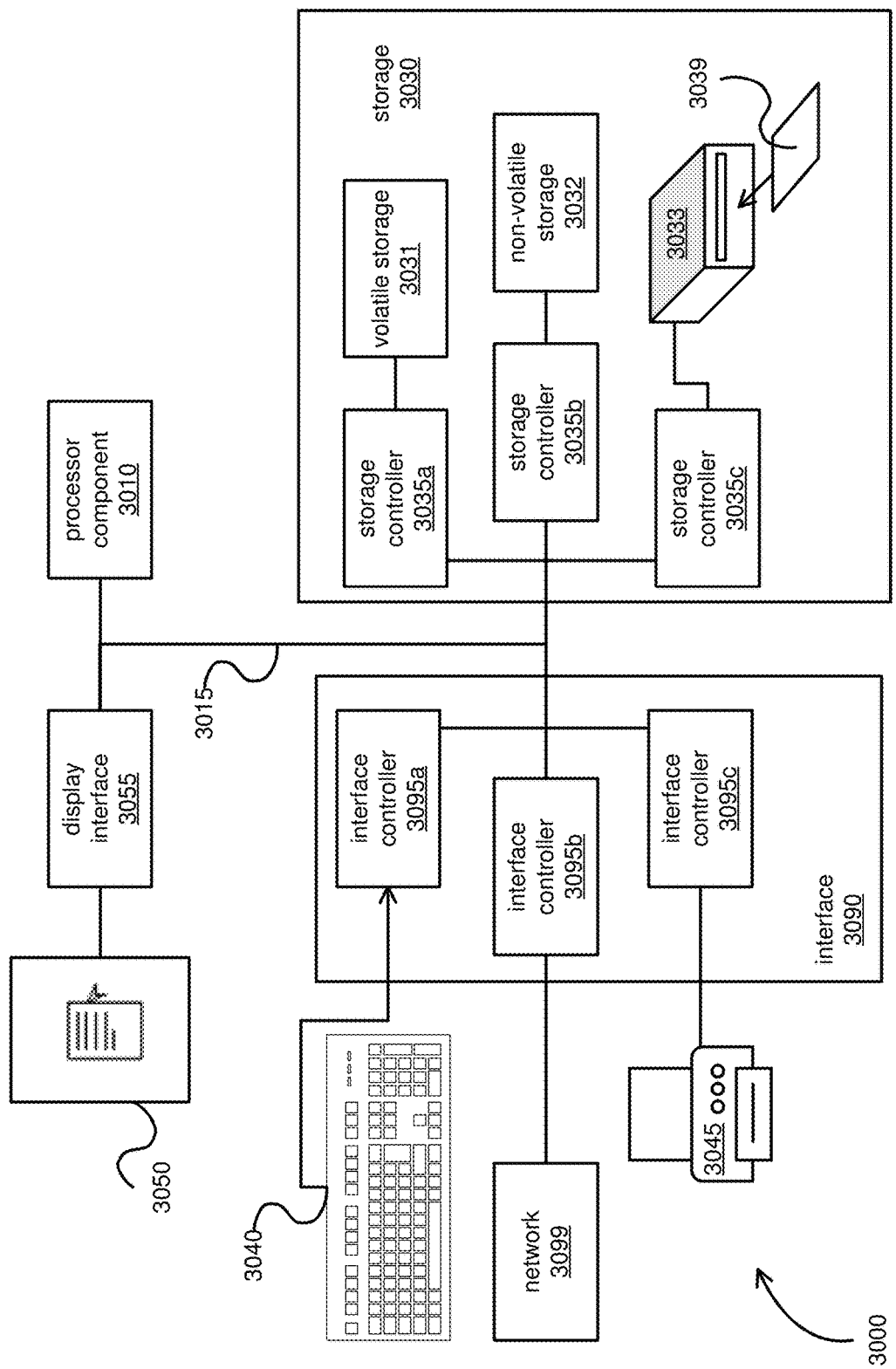
FIG. 8 illustrates an embodiment of a processing architecture.

FIG. 8 illustrates an embodiment of an exemplary processing architecture 3000 suitable for implementing various embodiments as previously described. More specifically, the processing architecture 3000 (or variants thereof) may be implemented as part of the device 100 of FIGS. 1-3.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 3010, a storage 3030, an interface 3090 to other devices, and coupling 3015. Depending on various aspects of a computing device implementing the processing architecture 3000, including its intended use and/or conditions of use, such a computing device may further incorporate additional components, such as without limitation, a counter element 3015.

The coupling 3015 incorporates one or more buses, point-to-point interconnects, transceivers, buffers, crosspoint switches, and/or other conductors and/or logic that communicatively couples at least the processor element 3010 to the storage 3030. The coupling 3015 may further couple the processor element 3010 to one or more of the interface 3090 and the display interface 3055 (depending on which of these and/or other components are also present). With the processor element 3010 being so coupled by couplings 3015, the processor element 3010 is able to perform the various ones of the tasks described at length, above, for whichever ones of the computing devices 100, 300 and 600 implement the processing architecture 3000. The coupling 3015 may be implemented with any of a variety of technologies or combinations of technologies by which signals are optically and/or electrically conveyed. Further, at least portions of couplings 3015 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 3010 may include any of a wide variety of commercially available processors, employing any of a wide variety of technologies and implemented with one or more cores physically combined in any of a number of ways.

As previously discussed, the storage 3030 may include one or more distinct storage devices based on any of a wide variety of technologies or combinations of technologies. More specifically, as depicted, the storage 3030 may include one or more of a volatile storage 3031 (e.g., solid state storage based on one or more forms of RAM technology), a non-volatile storage 3032 (e.g., solid state, ferromagnetic or other storage not requiring a constant provision of electric power to preserve their contents), and a removable media storage 3033 (e.g., removable disc or solid state memory card storage by which information may be conveyed between computing devices). This depiction of the storage 3030 as possibly comprising multiple distinct types of storage is in recognition of the commonplace use of more than one type of storage device in computing devices in which one type provides relatively rapid reading and writing capabilities enabling more rapid manipulation of data by the processor element 3010 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 3031 is present and is based on RAM technology, the volatile storage 3031 may be communicatively coupled to coupling 3015 through a storage controller 3035*a* providing an appropriate interface to the volatile storage 3031 that perhaps employs row and column addressing, and where the storage controller 3035*a* may perform row refreshing and/or other maintenance tasks to aid in preserving information stored within the volatile storage 3031. By way of another example, where the non-volatile storage 3032 is present and includes one or more ferromagnetic and/or solid-state disk drives, the non-volatile storage 3032 may be communicatively coupled to coupling 3015 through a storage controller 3035*b* providing an appropriate interface to the non-volatile storage 3032 that perhaps employs addressing of blocks of information and/or of cylinders and sectors. By way of still another example, where the removable media storage 3033 is present and includes one or more optical and/or solid-state disk drives employing one or more pieces of removable machine-readable storage media 3039, the removable media storage 3033 may be communicatively coupled to coupling 3015 through a storage controller 3035*c* providing an appropriate interface to the removable media storage 3033 that perhaps employs addressing of blocks of information, and where the storage controller 3035*c* may coordinate read, erase and write operations in a manner specific to extending the lifespan of the machine-readable storage media 3039.

One or the other of the volatile storage 3031 or the non-volatile storage 3032 may include an article of manufacture in the form of a machine-readable storage media on which a routine comprising a sequence of instructions executable by the processor element 3010 may be stored, depending on the technologies on which each is based. By way of example, where the non-volatile storage 3032 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 3032 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 3010 may initially be stored on the machine-readable storage media 3039, and the removable media storage 3033 may be subsequently employed in copying that routine to the non-volatile storage 3032 for longer term storage not requiring the continuing presence of the machine-readable storage media 3039 and/or the volatile storage 3031 to enable more rapid access by the processor element 3010 as that routine is executed.

As previously discussed, the interface 3090 may employ any of a variety of signaling technologies corresponding to any of a variety of communications technologies that may be employed to communicatively couple a computing device to one or more other devices. Again, one or both of various forms of wired or wireless signaling may be employed to enable the processor element 3010 to interact with input/output devices (e.g., the depicted example keyboard 3040 or printer 3045) and/or other computing devices, possibly through a network (e.g., the network 3099) or an interconnected set of networks. In recognition of the often greatly different character of multiple types of signaling and/or protocols that must often be supported by any one computing device, the interface 3090 is depicted as comprising multiple different interface controllers 3095a, 3095b and 3095c. The interface controller 3095a may employ any of a variety of types of wired digital serial interface or radio frequency wireless interface to receive serially transmitted messages from user input devices, such as the depicted keyboard 3040. The interface controller 3095b may employ any of a variety of cabling-based or wireless signaling, timings and/or protocols to access other computing devices through the depicted network 3099 (perhaps a network comprising one or more links, smaller networks, or perhaps the Internet). The interface 3095c may employ any of a variety of electrically conductive cabling enabling the use of either serial or parallel signal transmission to convey data to the depicted printer 3045. Other examples of devices that may be communicatively coupled through one or more interface controllers of the interface 3090 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 3050), such a computing device implementing the processing architecture 3000 may also incorporate the display interface 3055. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 3055 in a communicative coupling of the display 3050 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

EXAMPLE 1

At least one machine-readable storage medium comprising instructions that when executed by a computing-system, cause the computing-system to: generate a signed system management mode (SMM) information element, the signed SMM information element to include an indication of an SMM invoker and a signature to authenticate the SMM invoker; store the SMM information element to a location in a computer-readable storage; and generate an instruction pointer (IP) information element, the IP information element to include an indication of an address of the location in the computer-readable storage.

EXAMPLE 2

The at least one machine-readable storage medium of example 1, comprising instructions that cause the computing-system to store the SMM information element in a page of the computer-readable storage location.

EXAMPLE 3

The at least one machine-readable storage medium of example 2, the page comprising 4 kilobytes.

EXAMPLE 4

The at least one machine-readable storage medium of example 1, comprising instructions that cause the computing-system to generate the SMM information element via an operating system (OS) SMM driver.

EXAMPLE 5

The at least one machine-readable storage medium of example 4, comprising instructions that cause the computing-system to generate a hash value of the OS SMM driver, the signed SMM information element to include an indication of the hash value.

EXAMPLE 6

The at least one machine-readable storage medium of example 1, comprising instructions that cause the computing-system to invoke a SMM and communicate the IP information element to the SMM.

EXAMPLE 7

The at least one machine-readable storage medium of example 1, comprising instructions that cause the computing-system to receive the signature from a signing server, the signature based on a private key, the private key corresponding to a public-private key-pair.

EXAMPLE 8

At least one machine-readable storage medium comprising instructions that when executed by a computing-system, cause the computing-system to: receive an instruction pointer (IP) information element, the IP information element to include an indication of an address of a location in a computer-readable storage; retrieve a signed system management mode (SMM) information element from the computer-readable storage based on the address, the signed SMM information element to include an indication of an SMM invoker and a signature to authenticate the SMM invoker; determine whether the signature is valid; and execute one or more operations in a SMM based on the SMM invoker and a determination that the signature is valid.

EXAMPLE 9

The at least one machine-readable storage medium of example 8, comprising instructions that cause the computing-system to search the computer-readable storage at least 4 kilobytes before the address and at least 4 kilobytes after the address to identify a header corresponding to the signed SMM information element.

EXAMPLE 10

The at least one machine-readable storage medium of example 8, the indication of the address in the IP information element to comprise a virtual address, the at least one machine-readable storage medium comprising instructions that cause the computing-system to translate the virtual address to a physical address.

EXAMPLE 11

The at least one machine-readable storage medium of example 8, the signed SMM information element to include an indication of a hash value of an operating system (OS) SMM driver, the at least one machine-readable storage medium comprising instructions that cause the computing-system to authenticate the OS SMM driver based on the hash value.

EXAMPLE 12

The at least one machine-readable storage medium of example 11, comprising instructions that cause the computing-system to: determine whether the OS SMM driver is authorized to invoke the one or more operations in the SMM based on the hash value; and restrict execution of the one or more operations in the SMM based on a determination that the OS SMM driver is not authorized to invoke the one or more operations in the SMM.

EXAMPLE 13

The at least one machine-readable storage medium of example 8, comprising instructions that cause the computing-system to authenticate the signature based on a public key, the public key corresponding to a public-private key-pair.

EXAMPLE 14

An apparatus, comprising: logic, a portion of which is implemented in hardware, the logic to comprise: an operating system (OS) system management mode (SMM) driver component to: generate a signed system management mode (SMM) information element, the signed SMM information element to include an indication of an SMM invoker; and store the SMM information element to a location in a computer-readable storage; a signature receiving component to receive a signature to authenticate the SMM invoker and add the signature to the signed SMM information element; and an instruction pointer (IP) generation component to generate an IP information element, the IP information element to include an indication of an address of the location in the computer-readable storage.

EXAMPLE 15

The apparatus of example 14, the OS SMM driver component to store the SMM information element in a page of the computer-readable storage.

EXAMPLE 16

The apparatus of example 15, the page comprising 4 kilobytes.

EXAMPLE 17

The apparatus of example 14, the IP generation component to generate a hash value of the OS SMM driver and to add an indication of the hash value to the signed SMM information element.

EXAMPLE 18

The apparatus of example 14, the IP generation component to invoke a SMM and communicate the IP information element to the SMM.

EXAMPLE 19

The apparatus of example 14, the signature based on a private key, the private key corresponding to a public-private key-pair.

EXAMPLE 20

An apparatus, comprising: logic, a portion of which is implemented in hardware, the logic to comprise: an instruction pointer (IP) handler component to: receive an instruction pointer (IP) information element, the IP information element to include an indication of an address of a location in a computer-readable storage; and retrieve a signed system management mode (SMM) information element from the computer-readable storage based on the address, the signed SMM information element to include an indication of an SMM invoker and a signature to authenticate the SMM invoker; an invoker signature verification component to determine whether the signature is valid; and an SMM operator component to execute one or more operations in a SMM based on the SMM invoker and a determination that the signature is valid.

EXAMPLE 21

The apparatus of example 20, the IP handler component to search the computer-readable storage at least 4 kilobytes before the address and at least 4 kilobytes after the address to identify a header corresponding to the signed SMM information element.

EXAMPLE 22

The apparatus of example 20, the indication of the address in the IP information element to comprise a virtual address, the IP handler component to translate the virtual address to a physical address.

EXAMPLE 23

The apparatus of example 20, the signed SMM information element to include an indication of a hash value of an operating system (OS) SMM driver, the invoker signature verification component to authenticate the OS SMM driver based on the hash value.

EXAMPLE 24

The apparatus of example 23, the invoker signature verification component to: determine whether the OS SMM driver is authorized to invoke the one or more operations in the SMM based on the hash value; and restrict execution of the one or more operations in the SMM based on a determination that the OS SMM driver is not authorized to invoke the one or more operations in the SMM.

EXAMPLE 25

The apparatus of example 20, the invoker signature verification component to authenticate the signature based on a public key, the public key corresponding to a public-private key-pair.

EXAMPLE 26

A computer-implemented method, comprising: generating a signed system management mode (SMM) information element, the signed SMM information element to include an indication of an SMM invoker and a signature to authenticate the SMM invoker; storing the SMM information element to a location in a computer-readable storage; and generating an instruction pointer (IP) information element, the IP information element to include an indication of an address of the location in the computer-readable storage.

EXAMPLE 27

The method of example 26, comprising storing the SMM information element in a page of the computer-readable storage.

EXAMPLE 28

The method of example 27, the page comprising 4 kilobytes.

EXAMPLE 29

The method of example 26, comprising generating the SMM information element via an operating system (OS) SMM driver.

EXAMPLE 30

The method of example 29, comprising generating a hash value of the OS SMM driver and adding an indication of the hash value to the signed SMM information element.

EXAMPLE 31

The method of example 26, comprising sending a control signal to invoke a SMM and communicating the IP information element to the SMM.

EXAMPLE 32

The method of example 26, comprising receiving the signature from a signature server, the signature based on a private key, the private key corresponding to a public-private key-pair.

EXAMPLE 33

A computer-implemented method, comprising: receiving an instruction pointer (IP) information element, the IP information element to include an indication of an address of a computer-readable storage location; retrieving a signed system management mode (SMM) information element from the computer-readable storage location based on the address, the signed SMM information element to include an indication of an SMM invoker and a signature to authenticate the SMM invoker; determining whether the signature is valid; and executing one or more operations in a SMM based on the SMM invoker and a determination that the signature is valid.

EXAMPLE 34

The method of example 33, comprising searching the computer-readable storage location at least 4 kilobytes before the address and 4 kilobytes after the address to identify a header corresponding to the signed SMM information element.

EXAMPLE 35

The method of example 33, the indication of the address in the IP information element to comprise a virtual address, the method comprising translating the virtual address to a physical address.

EXAMPLE 36

The method of example 33, the signed SMM information element to include an indication of a hash value of an operating system (OS) SMM driver, the method comprising authenticating the OS SMM driver based on the hash value.

EXAMPLE 37

The method of example 36, comprising: determining whether the OS SMM driver is authorized to invoke the one or more operations in the SMM based on the hash value; and restricting execution of the one or more operations in the SMM based on a determination that the OS SMM driver is not authorized to invoke the one or more operations in the SMM.

EXAMPLE 38

The method of example 33, comprising authenticating the signature based on a public key, the public key corresponding to a public-private key-pair.

EXAMPLE 39

An apparatus for a device, the apparatus comprising means for performing the method of any one of examples 26 to 38.

The invention claimed is:

1. An apparatus, comprising:
logic, at least a portion of the logic implemented in hardware, the logic to:
generate a signed system management mode (SMM) information element associated with an SMM invoker; and
communicate an indication of a virtual address or a physical address of the signed SMM information element in a computer-readable storage and a control signal to initiate an SMM session, the indication of the virtual address or the physical address of the signed SMM information element used to authenticate the SMM invoker for the SMM session.

2. The apparatus of claim 1, the signed SMM information element comprising the SMM invoker.

3. The apparatus of claim 1, the signed SMM information element comprising a signature generated based on a private key, the signature used to authenticate the SMM invoker for the SMM session based on a public key.

4. The apparatus of claim 1, the signed SMM information element comprising an indication of a hash of the SMM invoker.

5. The apparatus of claim 4, the indication of the hash of the SMM invoker used to verify a privilege of the SMM invoker in the SMM session.

6. The apparatus of claim 4, the logic to generate the hash of the SMM invoker.

7. The apparatus of claim 1, the SMM invoker comprising a driver or an application.

8. The apparatus of claim 1, the logic to store the signed SMM information element to the virtual address or the physical address in the computer-readable storage.

9. The apparatus of claim 8, the indication of the virtual address or the physical address of the signed SMM information element comprising an instruction pointer (IP) information element.

10. The apparatus of claim 9, the logic to generate the IP information element.

11. A computer-implemented method, comprising:
generating a signed system management mode (SMM) information element associated with an SMM invoker; and
communicating an indication of a virtual address or a physical address of the signed SMM information element in a computer-readable storage and a control signal to initiate an SMM session, the indication of the virtual address or the physical address of the signed SMM information element used to authenticate the SMM invoker for the SMM session.

12. The computer-implemented method of claim 11, the signed SMM information element comprising the SMM invoker.

13. The computer-implemented method of claim 11, the signed SMM information element comprising a signature generated based on a private key, the signature used to authenticate the SMM invoker for the SMM session based on a public key.

14. The computer-implemented method of claim 11, the signed SMM information element comprising an indication of a hash of the SMM invoker.

15. The computer-implemented method of claim 14, the indication of the hash of the SMM invoker used to verify a privilege of the SMM invoker in the SMM session.

16. The computer-implemented method of claim 14, comprising generating the hash of the SMM invoker.

17. The computer-implemented method of claim 11, the SMM invoker comprising a driver or an application.

18. The computer-implemented method of claim 11, comprising storing the signed SMM information element to the virtual address or the physical address in the computer-readable storage.

19. The computer-implemented method of claim 18, the indication of the virtual address or the physical address of the signed SMM information element comprising an instruction pointer (IP) information element.

20. The computer-implemented method of claim 19, comprising generating the IP information element.

21. An apparatus, comprising:
  logic, at least a portion of the logic implemented in hardware, the logic to:
    identify an indication of a virtual address or a physical address of a signed system management mode (SMM) information element associated with an SMM invoker, the virtual address or the physical address in a computer-readable storage; and
    authenticate the SMM invoker for an SMM session based on the indication of the virtual address or the physical address of the signed SMM information element.

22. The apparatus of claim 21, the logic to verify a privilege of the SMM invoker in the SMM session based on the signed SMM information element.

23. The apparatus of claim 21, the logic to authenticate the SMM invoker for the SMM session based on a signature included in the signed SMM information element.

24. The apparatus of claim 21, the indication of the virtual address or the physical address of the signed SMM information element comprising an instruction pointer (IP) information element.

25. The apparatus of claim 21, the logic to access the signed SMM information element based on the indication of the virtual address or physical address of the signed SMM information element.

* * * * *